United States Patent [19]

Winter et al.

[11] Patent Number: 5,398,989
[45] Date of Patent: Mar. 21, 1995

[54] CENTRAL PILLAR FOR THE BODYWORK OF A PASSENGER CAR

[75] Inventors: Karin Winter, Gaimersheim; Norbert Enning, Denkendorf; Ulrich Klages; Karl Reiter, both of Lenting; Klaus Schmolke, Hepberg, all of Germany

[73] Assignee: Audi A.G., Ingolstadt, Germany

[21] Appl. No.: 75,591

[22] PCT Filed: Nov. 29, 1991

[86] PCT No.: PCT/EP91/02264

§ 371 Date: Jun. 15, 1993

§ 102(e) Date: Jun. 15, 1993

[87] PCT Pub. No.: WO92/11158

PCT Pub. Date: Jul. 9, 1992

[30] Foreign Application Priority Data

Dec. 20, 1990 [DE] Germany .................. 40 40 980.5

[51] Int. Cl.⁶ ............................................. B62D 25/04
[52] U.S. Cl. ..................... 296/203; 296/188; 296/202; 296/205; 29/557; 29/558; 52/731.6; 72/254
[58] Field of Search ............... 296/202, 203, 205, 188; 72/254; 29/557, 558; 52/730.1, 731.2, 731.6, 732.1, 732.3

[56] References Cited

U.S. PATENT DOCUMENTS

| | | | |
|---|---|---|---|
| 2,192,075 | 2/1940 | Gregoire | 296/28 |
| 2,197,644 | 4/1940 | Krogh . | |
| 4,826,238 | 5/1989 | Misono et al. | 52/731.6 X |
| 4,986,597 | 1/1991 | Clausen | 52/731.6 X |
| 4,988,230 | 1/1991 | Banthia et al. | 403/178 X |

FOREIGN PATENT DOCUMENTS

| | | |
|---|---|---|
| 0303431 | 2/1989 | European Pat. Off. . |
| 3406609 | 10/1985 | Germany . |
| 3429447 | 2/1986 | Germany . |
| 3709489 | 7/1988 | Germany . |
| 59-50938 | 7/1984 | Japan . |
| 575601 | 2/1946 | United Kingdom . |
| 737655 | 9/1955 | United Kingdom . |
| 9014981 | 12/1990 | WIPO . |

*Primary Examiner*—Dennis H. Pedder
*Attorney, Agent, or Firm*—Jacques M. Dulin

[57] ABSTRACT

The invention relates to a conical central pillar assembly for the bodywork of a passenger car, especially a bodywork having a space-frame bearing structure constructed from extruded light metal section bearers and cast light metal joining elements. According to the invention, the central pillar assembly includes a substantially plate-like base section wall having a multi-layer, multi-chamber extruded section disposed thereon. The section chambers in the outermost layers are selectively cut at various heights in step wise fashion in order to produce a desired conical cross section with a wide base portion and narrow top portion. Additional cuts are made in the outermost section chambers to form recesses for accommodating door locks, hinge assemblies and the like. An additional piece, preferably in the form of a light metal casting or a sheet metal stamping, is provided and forms an outer cover for at least a bottom portion of the central pillar.

19 Claims, 2 Drawing Sheets

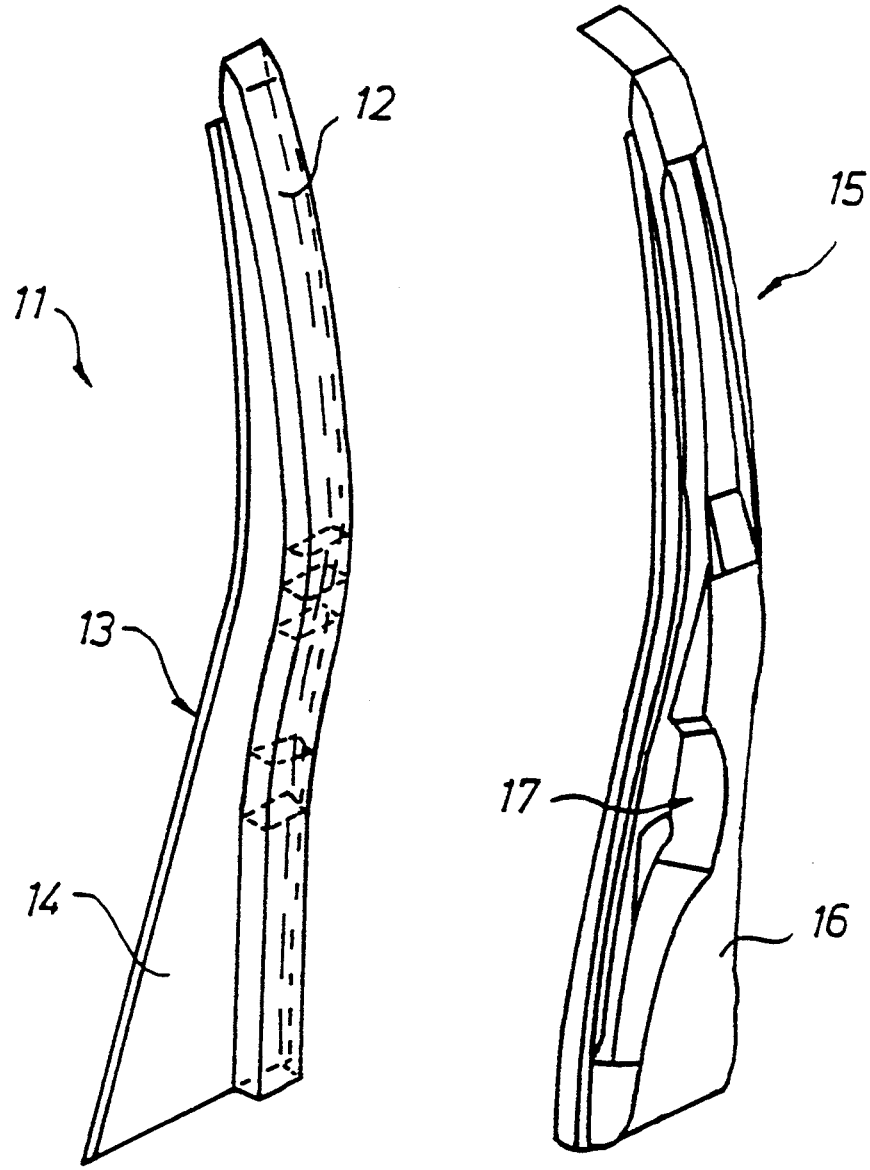

CENTRAL PILLAR FOR THE BODYWORK OF A PASSENGER CAR

FIELD

The present invention relates generally to improvements in motor vehicle bodywork fabrication, and more particularly to an improved central pillar assembly (B post) for a passenger car bodywork and fabrication method thereof.

BACKGROUND

In passenger cars of the type having a self-supporting bodywork, the bodywork, including the bearing structure, is typically made from a plurality of sheet metal pieces. The hollow section bearers of the bearing structure are formed by welding together at least two deep-drawn metal sheets. An example where such hollow section bearers are used as central pillars in a vehicle bodywork is disclosed in U.S. Pat. No. 2,192,075.

The central pillars of the vehicle bodywork perform an important function in the bearing structure since they provide the necessary rigidity for the passenger compartment. As a consequence, they must be able to withstand heavy loads, especially during a side impact. Due to the requirements expected of such central pillars, the cross sectional configuration of the central pillars must have a conically upward taper over its entire vertical length and must also include a door sealing flange which extends over the entire length as a bearing surface. Furthermore, the central pillars preferably include recesses for receiving door hinges, lock bolts and the like.

In accordance with conventional sheet metal fabrication techniques, it is possible to form a central pillar member having the desired conical cross section which also includes all the necessary recesses formed integrally therewith. However, the rigidity of a hollow section central pillar fabricated solely from two sheet metal halves is insufficient to provide satisfactory protection for the passengers in a side collision. Thus, such structures require extensive and costly reinforcement measures, including the use of several additional sheet metal parts, in order to provide the necessary strength and rigidity characteristics.

The steel sheets used to construct such self-supporting vehicle bodyworks are typically shaped in a deep drawing process. While the dies used for shaping the steel sheets are relatively expensive, they do provide a cost-favorable solution for mass production since they permit large production runs. However, in view of the high investment costs for tooling, the aforesaid process is very cost-intensive for smaller production runs.

A more cost-favorable solution for small production runs is known, for example, from European patent document EP 0 146 716. In this document, a vehicle bodywork construction for a passenger car is disclosed wherein the bearing structure for the bodywork comprises hollow section frame members joined by node connector elements. The hollow section frame members are formed as extruded aluminum sections and the node connector elements are formed as light metal (e.g., aluminum alloy) castings. In addition to providing a more cost-favorable solution for small production runs, the aluminum bodywork disclosed in EP 0 146 716 is both lighter in weight and is more resistant to corrosion than a sheet metal bodywork.

However, in the specific embodiment described according to this prior art, the central pillars which connect the extruded aluminum side roof frame members to the aluminum door sills comprise sheet metal components instead of aluminum components. The reason being is that it is unconventional to use extruded sections for structural components which require a variable cross section, (such as, for example, the conical central pillar in this case) since extruded sections have a constant cross section over their entire length in view of the limitations inherent to the extrusion processes.

A frame-like bearing structure for vehicles comprising multi-chamber extruded sections fitted together by narrow chamber slots is known, for example, from Japanese Patent Document JP-A-59 050 938. According to this document, a compound bearer having diverging branch-like sections is produced by separating the outer walls of the chamber slots at specified lengthwise regions such that the resulting individual hollow sections are disposed lying freely alongside each other where they are then bent relative to each other. Thus, the hollow sections are fitted together at the non-cut points, which makes it possible to eliminate costly and (for light metals) sometimes problematical weld connections or glue connections. Thus, several branching bearers are produced from a single multi-chamber extruded section. However, this branching technique is not suitable for fabrication of an extruded section door pillar of a vehicle, since in this application it is necessary to form only a single door pillar bearer (i.e., without branching) which has an upward conically tapering trend in its lengthwise direction.

British Patent Document GB-A-575 601 discloses an extruded section rod for manufacture of a superstructure of a bus wherein flanges are formed along either side of a section chamber. These flanges are cut away in the region of window openings. This document, however, does not teach or suggest how to form the extruded section with a generally conical trend.

It is known from the prior art how to form a composite frame structure having a variable cross section. For example, published WIPO document WO-A-9 014 981 discloses an extruded box section frame member for a motor vehicle body of constant cross section which is joined by a preshaped and generally concave sheet metal piece. The sheet metal piece partially embraces the extruded box section frame member such that an enclosed cavity region is formed. The outer convex surface of the preshaped sheet metal piece forms a portion of the outer contour of the vehicle body. This document, however, does not teach or suggest how to form a frame member with a tapering cross section constructed solely from extruded light metal components.

THE INVENTION

OBJECTS

It is therefore an object of the present invention to provide an extruded light metal central pillar construction for a vehicle bodywork which overcomes the problems of the prior art and which has a desired conical trend over its vertical length.

It is another object of the present invention to provide a central pillar construction of the type described which is lightweight and provides adequate rigidity to the vehicle bodywork.

It is another object of the present invention to provide an extruded light metal central pillar construction of the type described which is simple and inexpensive to manufacture.

Other and further objects and advantages will no doubt become apparent from the following written description, drawings and appended claims.

DRAWINGS

FIG. 3 is a perspective view showing a continuous extruded section for a central pillar having a side profile cut in a base section wall which forms a continuous door sealing flange.

FIG. 4 is a perspective of the central pillar similar to FIG. 3 shown with an additional cover piece mounted thereon.

SUMMARY

Figures 1, 2:
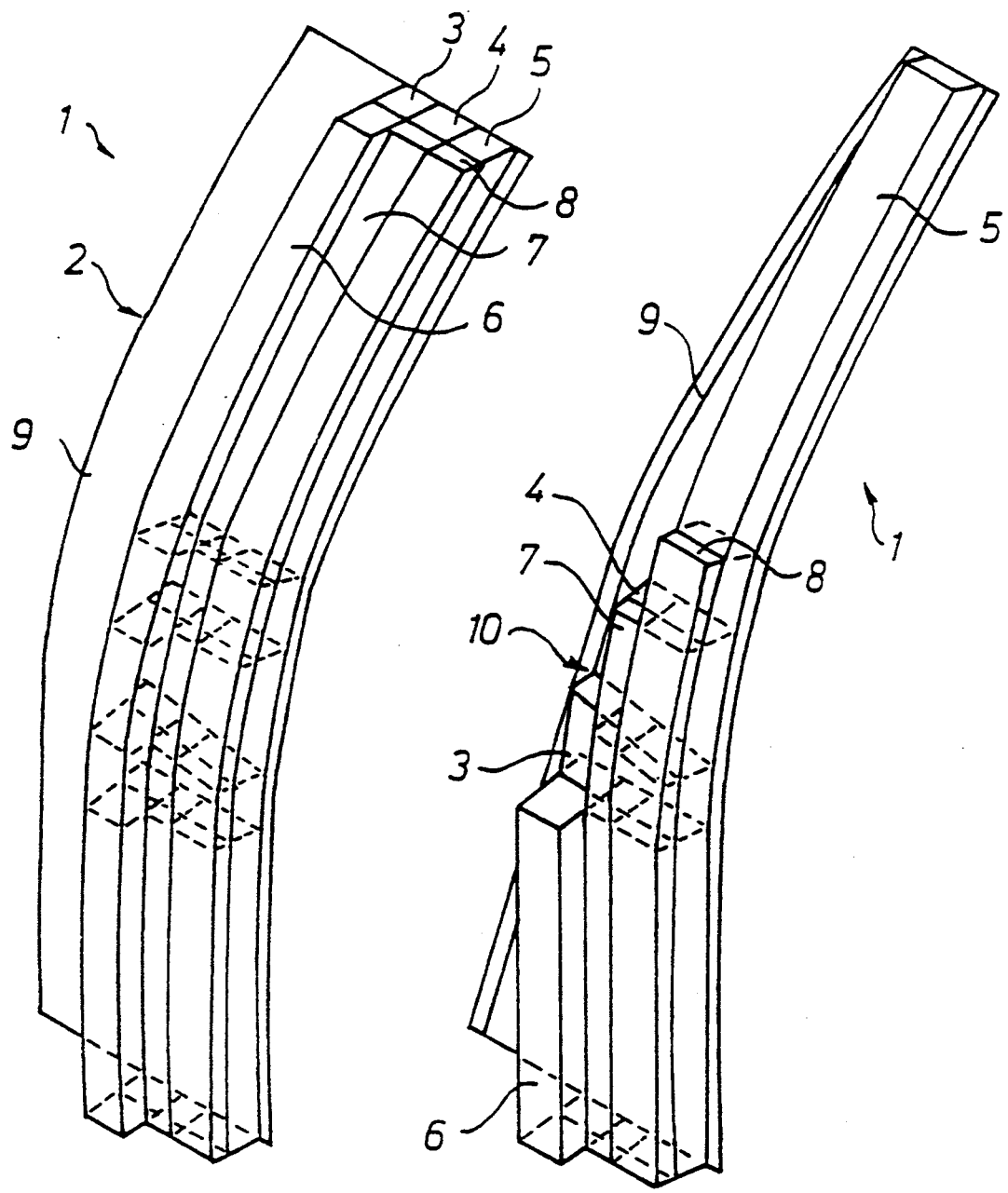
FIG. 1 is a perspective view of a multi-chamber extruded section for a central pillar of the present invention shown in an intermediate state of manufacture (i.e., subsequent to bending and prior to cutting).
FIG. 2 is a perspective view of the multi-chamber extruded section of FIG. 1 shown after selected chamber sections have been cut away to produce an upwardly tapered conical cross sectional trend with additional cutouts.

The central pillar assembly of the present invention consists of at least one extruded section. This eliminates the disadvantages mentioned at the outset for a two piece welded sheet metal structure for a central pillar, and in particular, the requirement of additional reinforcing pieces to increase the strength of the central pillar. Furthermore, it is far easier to connect a central pillar constructed of light metal to both a door sill and a roof section which are also constructed of the same light metal material, such as for example, by welding, than it is to make such connections using different metals. Advantageous embodiments shall be described hereafter.

In a preferred embodiment of the invention, the central pillar assembly comprises a multi-chamber extruded section which extends over the entire vertical length of the central pillar assembly. The multi-chamber extruded section contains several section chambers in the form of lengthwise hollow sections that are separated by webs. An upper portion of at least one of the section chambers is cut away in order to produce an upward conical trend for the central pillar and/or to produce cut-outs or recesses in the pillar assembly for receiving fittings, such as for example, door hinges, lock bolts, and the like. The individual section chambers are selectively cut and arranged alongside each other such that laterally consecutive section chambers are stepped in height (i.e., in the lengthwise or vertical direction) in order to produce an upward tapering trend for the central pillar, as seen in side elevation. For instance, the outermost section chamber may be cut in a bottom region, so that only a short segment extends upward from the bottom. An adjacent section chamber may then be cut somewhat further upward toward the middle, and so on.

To produce a desired upward side taper when viewed in the lengthwise direction of the vehicle, it is proposed to arrange section chambers of the multi-chamber extruded section one above the other in layers and again cut the laterally consecutive section chambers of the outer layer in stepped height intervals. For example, the outermost section chamber (i.e., the section chamber in the outer most layer) is again preferably cut in a lower region, so that it extends a short distance upward in this lower region. The section chamber immediately adjacent (i.e., inwardly disposed of) the outer most section chamber is then cut somewhat further up, and so on. It is advisable to cut the section chambers at an upward angle such that the outer surfaces slant upward and conform to the upward conical trend.

It is advantageous to arrange the section chambers on a common base section wall and to cut the section chambers in such a way that the base section wall remains intact and thus forms an inner wall at the side of the vehicle bodywork. The base section wall can also be designed with somewhat greater material thickness, if necessary.

A door sealing flange which extends along the entire length of the central pillar and serves as a bearing surface adjusted to the contour of the door is easily produced in accordance with the invention. For this, the base section wall is designed to project or extend laterally at a distance from a vertical side edge region of the multi-chamber extruded section as a single side piece or flange in the fabricated condition of the extruded section. This single-wall side edge or flange can then be easily cut along an angle to form a desired taper in conformance with the upward conical trend of the rest of the pillar assembly.

A further adjustment of the extruded section to the trend of the outer contour of the bodywork is achieved by bending the extruded section in a desired lengthwise curve in a familiar fashion after fabrication or after cutting.

As a result of the cutting, the section chambers are open at the cut surfaces. Therefore, it is proposed to provide a cover piece having a coverage area sufficiently large to enclose at least the cut surface regions of the multi-chamber extruded section central pillar assembly. Preferably, the cover piece is formed as a preshaped sheet metal piece or as light metal casting. Alternatively, the cover piece may be formed as a molded plastic piece. In any case, the connection of the cover piece to the extruded section central pillar provides a further increase in stiffness to the central pillar assembly. Recesses for door fitting hardware, especially locks and hinges, can be advantageously formed integrally within the additional cover piece without further need for machining the extruded section. These free spaces can be formed in a cover piece made as a light metal casting, a sheet metal stamping, or as a plastic molding.

The formation of the central pillar assembly as a single-piece, continuous hollow extruded section from top to bottom with at least one section chamber provides the required strength necessary to satisfy the requirements for effective passenger protection in a side collision. The requisite vertical length of a central pillar can be produced as a structural piece, while the conical shape is easily achieved by selective cutting of the individual section chambers. The manufacturing and fabrication costs are relatively low. Recesses sized for receiving door fitting hardware such as locks and hinges are also easily formed as cut-outs in the walls of the section chambers. A further advantage is that the abrupt changes in rigidity along the central pillar, which result from the cutting, make it possible to be able to control a desired buckling or bending behavior of the central pillar assembly when subjected to load.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a central pillar assembly in the bodywork of a passenger car formed as a single-piece, multi-chamber extruded section 1. The multi-chamber extruded section 1 includes a base section wall 2, having a first or base layer of section chambers 3, 4, 5 disposed on an outer surface 2a thereof. The inner surface 2b of the base section wall 2 faces toward the passenger compartment when the central pillar assembly 1 is fitted within a vehicle bodywork (not shown). Section chambers 6, 7, 8 are arranged as a second layer across the first layer of section chambers 3, 4, 5 and are separated therefrom by webs (not shown). The base section wall 2 is preferably formed as a single-wall sheet having a relatively large width and includes at least one vertical side edge 9 which projects laterally beyond the region of the section chambers.

In accordance with a method aspect of the invention, the multi-chamber extruded section 1 is bent in an appropriate device to provide a side curve which conforms to the vertical side profile or trend of the vehicle body. In FIG. 1, the multi-chamber extruded section 1 is shown after the bending step has taken place.

In order to produce a conical trend for the central pillar assembly 1 such that it has a larger cross sectional profile in its lower region adjacent the door sill and a smaller cross sectional profile in its upper region adjacent the roof frame, the section chambers 3-8 are cut in stepwise fashion, as clearly indicated in FIG. 2. The base or first layer section chamber 5 remains intact over its entire length along the central pillar, whereas for example, the second and third outer layer section chambers 3 and 6, respectively, are cut in stepwise fashion in a lower region. Chambers 4 and 7 are preferably cut to form a free space or recess 10 sized for receiving door fitting hardware such as a lock bolt. The chambers may also be selectively cut where appropriate to form recesses for receiving other fittings such as door hinges, lock bolts and the like.

The exposed laterally extending side edge 9 of the base section wall 2 is also cut at a taper such that it conforms to a desired conical trend for the central pillar along its entire length. The cutting of side edge 9 as shown results in a continuous door sealing flange.

The stepwise cuts shown in FIG. 2 can also be produced with upward slanting cut surfaces which follow the conical trend of the central pillar assembly. The cut areas are preferably covered with a covering piece (not shown).

FIG. 3 shows an extruded section 11 for a central pillar which includes a continuous section chamber 12 disposed on a base section wall 13. As before the base section wall 13 includes a side edge 14 which extends laterally at a distance from the section chamber 12. In the state of manufacture represented by FIG. 3, the extruded section 11 has already been bent to form a curve in conformance with the side contour of the vehicle bodywork and the side edge 14 has already been cut with a desired upward taper, thus producing a suitable door sealing flange as a bearing surface along the entire length.

FIG. 4 shows a completely assembled central pillar 15, for which an extra cover piece 16 has been mounted to the outside of the extruded section 11 of FIG. 3. The cover piece 16 is preferably formed as either a deep-drawn sheet metal piece or as a light metal casting or even as a molded plastic piece. The cover piece 16 preferably extends conically upward to approximately the middle height of the central pillar as a footing.

The cover piece 16 is firmly joined to the extruded section 11, so that the lower region of the central pillar 15 is stiffened. Furthermore, the necessary recesses, such as the recess 17 shown in position for receiving a locking bolt, have been pre-formed in the cover piece 16 prior to final assembly. A similar cover piece may be used to cover the plural cut surfaces of the FIG. 1 and FIG. 2 embodiments.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A central pillar assembly for connecting a roof frame member to a door sill in a passenger car bodywork comprising in operative combination:
    a) a generally planar base section wall of a vertical length sufficient to extend between said roof frame member and said door sill, said base section wall having a first inner surface disposed facing an interior passenger space of said bodywork and a second outer surface disposed facing outwardly of said vehicle bodywork; and
    b) a multi-chamber portion disposed on said second outer surface and extending over said vertical length of said base section wall, said multi-chamber portion including:
        i) a first plurality of vertically oriented section chambers arranged side by side to form a first layer of chambers on said base section wall outer surface; and
        ii) said first plurality of section chambers are stepped in height in lateral succession such that said central pillar assembly has a generally conical upward taper in side elevation view.

2. A central pillar assembly as in claim 1 wherein:
    a) said multi-chamber portion further includes a second plurality of section chambers arranged side by side on said first plurality of section chambers to form a second layer of chambers on said base section wall outer surface;
    b) said second plurality of section chambers are selectively stepped in height such that said central pillar assembly has a generally conical upward taper in front elevation view; and
    c) said base section wall, said first plurality of section chamber and said second plurality of section chambers are formed as a single light metal extrusion.

3. A central pillar assembly as in claim 2 wherein at least one of said section chambers of said multi-chamber portion includes at least one cut out portion which forms a recess for receiving door fitting hardware.

4. A central pillar assembly as in claim 2 which is curved to conform to a vertical profile contour of said bodywork.

5. A central pillar assembly as in claim 1 wherein:
   a) said base wall includes at least one side edge which extends a lateral distance beyond said multi-chamber portion and forms a door sealing flange.

6. A central pillar assembly as in claim 1 which includes a cover plate for covering at least a portion of said multi-chamber portion.

7. A central pillar assembly as in claim 6 wherein:
   a) said cover plate includes an outer surface having at least one recess formed integrally therein; and
   b) said integrally-formed recess is sized to receive a door hardware fitting.

8. A central pillar assembly as in claim 6 wherein said cover plate comprises sheet metal.

9. A central pillar assembly as in claim 6 wherein said cover plate comprises a light metal casting.

10. A central pillar assembly as in claim 7 wherein said cover plate comprises sheet metal.

11. A central pillar assembly as in claim 7 wherein said cover plate comprises a light metal casting.

12. A central pillar assembly as in claim 3 which is curved to conform to a vertical profile contour of said bodywork.

13. A central pillar assembly as in claim 12 wherein:
   a) said base section wall includes at least one side edge which extends a lateral distance beyond said multi-chamber portion and forms a door sealing flange.

14. A central pillar assembly as in claim 13 which includes a cover plate for covering at least a portion of said multi-chamber portion.

15. A central pillar assembly as in claim 14 wherein:
   a) said cover plate includes at least one recess formed integrally therein; and
   b) said integrally formed recess is sized to receive a door hardware fitting.

16. A central pillar assembly as in claim 14 wherein said cover plate comprises sheet metal.

17. A central pillar assembly as in claim 14 wherein said cover plate comprises a light metal casting.

18. A central pillar assembly as in claim 15 wherein said cover plate comprises sheet metal.

19. A central pillar assembly as in claim 15 wherein said cover plate comprises a light metal casting.

* * * * *